United States Patent

Sandström et al.

[11] Patent Number: 5,961,940
[45] Date of Patent: Oct. 5, 1999

[54] METHOD FOR THE TREATMENT OF BISMUTH-CONTAINING SULPHIDE ORES OR CONCENTRATES OF SUCH ORE

[75] Inventors: Åke Sandström, Luleå; Jan-Erik Sundkvist, Skellefteå, both of Sweden

[73] Assignee: Boliden AB, Sweden

[21] Appl. No.: 09/043,516

[22] PCT Filed: Oct. 31, 1996

[86] PCT No.: PCT/SE96/01397

§ 371 Date: Mar. 23, 1998

§ 102(e) Date: Mar. 23, 1998

[87] PCT Pub. No.: WO97/16574

PCT Pub. Date: May 9, 1997

[30] Foreign Application Priority Data

Oct. 31, 1995 [SE] Sweden .................................. 9503827

[51] Int. Cl.⁶ ................................................ C22B 30/00
[52] U.S. Cl. .................................................. 423/87
[58] Field of Search ................................ 423/87; 75/743

[56] References Cited

U.S. PATENT DOCUMENTS 4,342,591  8/1982  Lesoille .
4,740,243  4/1988  Krebs-yuill et al. ........................ 423/87
5,397,380  3/1995  Petersson et al. .......................... 75/743
5,443,622  8/1995  Gabb et al. .

FOREIGN PATENT DOCUMENTS 330680  12/1920  Germany .
91334   3/1987   Romania .

Primary Examiner—Steven Bos
Attorney, Agent, or Firm—Burns, Doane, Swecker & Mathis, LLP

[57] ABSTRACT

Disclosed is a method of pretreating sulphide ores or sulphide ore concentrates having high bismuth contents that have a disturbing influence on further processing of the ores or concentrates, such as to enable the ores or concentrates to be further processed for the recovery of their valuable metal contents or at least to facilitate such processing. The method is characterized by leaching the ore or the concentrate with sulfuric acid over a predetermined time period while supplying heat at a pH below 2, and thereafter separating from the leachate a leaching residue in the form of a product which is leaner in bismuth and more enriched with regard to its valuable metal content than the input material.

8 Claims, 1 Drawing Sheet

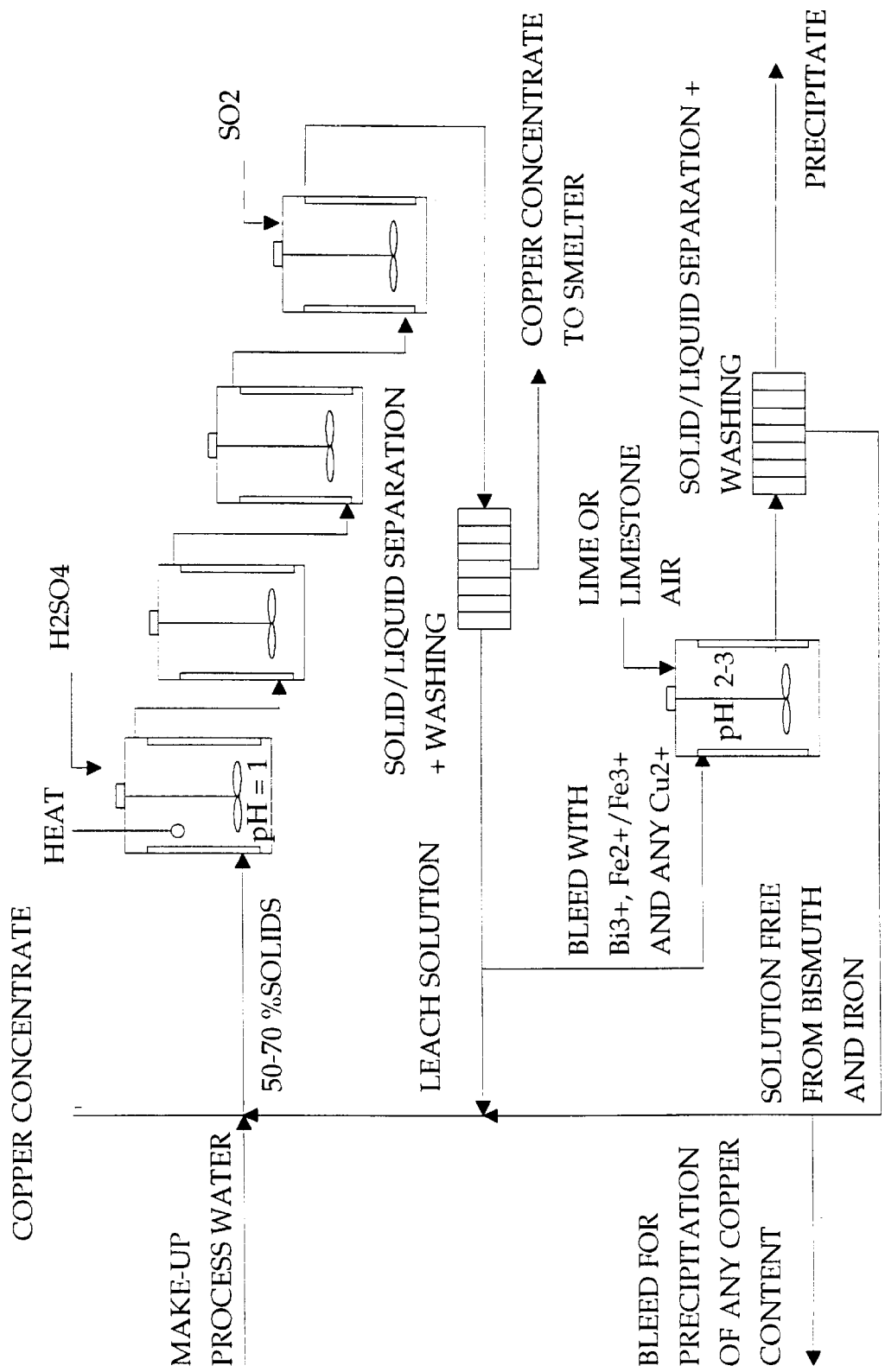

METHOD FOR THE TREATMENT OF BISMUTH-CONTAINING SULPHIDE ORES OR CONCENTRATES OF SUCH ORE

BACKGROUND OF THE INVENTION

1. Field of the Invention

The invention relates to a method of pretreating sulphide ores or sulphide ore concentrates that contain bismuth in concentrations obstructive to further processing of the ores or concentrates, so as to enable the ores and concentrates to be processed for the recovery of their valuable metal contents, or at least facilitate such processing.

2. Description of the Related Art

Sulphide ores and sulphide ore concentrates exist which because of their high bismuth contents either cannot be used for the recovery of their valuable metal contents or must at least be processed with great care, for instance diluted with bismuth-lean materials. The problems are most noticeable with material that shall primarily be processed to produce refined copper, either pyrometallurgically or hydrometallurgically, since in both cases there is carried out an electrolytic treatment process in which bismuth has a highly disturbing effect and contributes towards the formation of sludge/slime with the risk of serious impurity inclusions. Furthermore, refined copper is required to include a maximum of 1 ppm bismuth. Bismuth content limitations are also found in respect of lead and tin products, which is 50–100 ppm in the case of lead and 100–500 ppm in the case of tin.

The possibilities of handling bismuth in a pyrometallurgical copper producing process, for instance, are limited, because bismuth is a relatively noble element which is found in an elemental form in nature. Bismuth can be primarily separated as gaseous sulphide during the first stages of the copper process, i.e. during the smelting and converting stages, provided that good contact is obtained between the copper matte and gas and that the smelt has a high temperature. Bismuth extraction is not favoured by high-grade matte and the degree to which supplied process air is enriched with oxygen. Despite the aforesaid possibilities of reducing the bismuth content, separate bismuth purifying stages are often carried out in a later process stage, for instance in vacuum-refining or soda treatment process stages, although this often results in poor bismuth yields. In the majority of copper smelters, the maximum permitted bismuth content of the copper anodes used in the electrolytic refining process is as low as 50 ppm, so as to enable the aforesaid problems concerning sludge formations and the serious impurity inclusions caused thereby, implying bismuth contamination, among other things, can be avoided to the best possible extent. This means that the intake of bismuth to the copper process must be limited, and therewith also the intake of bismuth containing material. It is even necessary to reject certain materials because although the extraction of bismuth during the pyrometallurgical treatment process is relatively constant, it is much too low. As will be readily understood, attention must be aimed primarily towards productivity and process economy, which implies both high-grade matte and oxygen enrichment, which as before mentioned are not the best conditions under which bismuth is eliminated during the copper process.

Pretreatment of copper concentrates has been proposed with the intention of reducing different troublesome impurity contents of the concentrate prior to its further processing. Partial roasting can be used to reduce the arsenic content, but the bismuth content is only influenced marginally. The arsenic content, antimony content and mercury content can be reduced by sodium sulphide leaching, although the bismuth content is not influenced to any great extent by this treatment. In CA-A-1057310, Outokumpu have proposed pretreatment in a rotary furnace at 750° C. in a sulphur vapour atmosphere. This process eliminates 100% of the arsenic, 50–60% of the antimony, but only 20–30% of the bismuth content.

In EP-B-0138794, Boliden have proposed a method of eliminating primarily Sb from copper smelt material. The method includes a separate chlorinating stage with an essentially stoichiometric quantity of chlorinating agent in a rotary furnace at temperatures of 450–750° C., wherein Bi is also removed to a substantial extent. Bio-oxidative pretreatment, bio-leaching, for selectively leaching bismuth from copper concentrates has also been proposed. The selectivity and utility of bio-leaching to this end, however, would seem to be completely dependent on the mineralogical composition of the concentrate, and hence its use is limited to the treatment of certain specific concentrates of favourable composition.

SUMMARY OF THE INVENTION

The object of the present invention is to provide a method by which bismuth can be eliminated from sulphide ores or sulphide concentrates to an extent and with a selectivity with regard to valuable metal content such as to enable the material to be used generally for the pretreatment of such materials such that said materials can be readily processed and their valuable metal content recovered.

This object is achieved with a method having the characteristic features set forth in the present invention. Thus, the ore or the concentrate concerned is leached with sulfuric acid over a given time period at a pH below 2, while supplying heat. At the end of this predetermined time period, leaching residue is extracted from the leachate in the form of a product which is more bismuth-pure than the input material and in which the valuable metal content has been enriched. The leaching process is preferably carried out in a pH range of 0–1. In order to achieve the best possible result, the leaching temperature will preferably exceed 50° C. The leaching process is preferably carried out in a series of mutually sequential leaching stages. The consumed leachate may conveniently be treated with lime or limestone while adding air to precipitate leached-out quantities of bismuth and possibly iron in an hydroxide form, together with the sulphate content as gypsum.

BRIEF DESCRIPTION OF THE DRAWING

The drawing is a flow sheet illustrating bismuth leaching in accordance with one embodiment of the invention.

DESCRIPTION OF THE PREFERRED EMBODIMENTS

It is known that concentrated sulfuric acid or diluted sulfuric acid and air are able to react with elemental bismuth to form $Bi^{3+}$ ions, wherein sulfuric acid is reduced to $SO_2$. However, there are no earlier disclosures in the literature to the effect that sulfuric acid would react in the same way with sulfidic bismuth compounds. Neither is this probable due to the very strong affinity of bismuth to sulphur. Despite this, leaching with sulfuric acid under certain specified conditions nevertheless results in appreciable elimination of bismuth and furthermore selective elimination with respect to valuable metal contents must be considered remarkable and surprising. According to one theory, this may be due to complicated substitution reactions in the minerals between bismuth and valuable metals such as copper and silver. In addition to occurring as elemental bismuth, bismuth is also present, e.g., in sulfidic copper ores in the form of such sulphide minerals as

| | |
|---|---|
| atildite | Ag Bi $S_2$ |
| bismuth glance | $Bi_2 S_3$ |
| benjamite | Pb (Ag, Cu) $Bi_2 S_4$ |
| hammarite | $Pb_2 Cu_2 Bi_4 S_9$ |
| galenobismutite | Pb $Bi_2 S_4$ |
| emplecite | Cu Bi $S_2$ |
| aikinite | Pb Cu Bi $S_3$ |

The invention delivers bismuth yields of up to 90% and even higher, whereas leaching of a valuable metal such as copper is not greater than at most 2%. Iron, on the other hand, is leached out to a greater extent, resulting in a yield of up to 5–6%.

Thus, the inventive pretreatment process results in a product which in comparison with the input concentrate is purer with regard to Bi (and even to Sb and As to some extent) and is also in applicable cases enriched with respect to valuable metals, since any iron present is eliminated although albeit to a limited extent. The pretreated metal will thus be particularly attractive from several aspects with regard to processing its valuable metal content.

The invention will now be described in more detail partly with reference to a flow sheet illustrating a preferred embodiment of the invention including solution purification, and also with reference to an example illustrating leaching tests carried on a laboratory scale.

The accompanying drawing is a flow sheet illustrating bismuth leaching in accordance with the invention. Copper concentrate is taken from a thickener or filter with the relevant water content and, optionally after being diluted with additional water, is passed to a first leaching tank with a solids content of 50–70%. Sulfuric acid is added to the tank, so as to maintain the pH at about 1. The contents of the tank are heated with heat taken from an external source. A suitable temperature is 90° C. The tank contents are continuously transferred to a second tank connected in series, and from there to a third and a fourth tank. The volume of the tanks and the residence time in respective tanks are chosen with regard to the predetermined total leaching time. This leaching time is chosen, in turn, on the basis of the yields desired from the concentrate composition concerned. If suitable and if desired, $SO_2$ can be added to the last tank to precipitate leached copper. After a solid/liquid separation+washing stage, there is extracted an enriched and bismuth-free copper concentrate for further processing in a smelter. As shown in the flow sheet, the leachate and added washing water is divided into two parts, wherein $Bi^{3+}$, $Fe^{2+}/Fe^{3+}$ present in one part is precipitated with limestone while supplying air at a pH in the region of 3–5. Precipitate with bismuth-hydroxide, iron-hydroxide and gypsum is separated downstream of the solids/liquid separation+washing stage. Residual solution, which may still contain copper in the form of $Cu^{2+}$ ions, can be returned to the leaching stage as a liquid addition. Copper can precipitate from a bleed taken from this return flow, if so desired. The remainder of the leachate is returned to the first leaching tank as process liquid.

EXAMPLE

Copper concentrate from Aitik, which consists chiefly of the minerals chalcopyrite and pyrite, was leached in a series of tests. The bismuth content was 120 g/t and existed in the form of several different minerals, namely the earlier mentioned matildite, bismuth glance, benjaminite, hammarite, galenobismutite, emplecite and aikinite. A smaller part of total Bi was present as elemental bismuth.

The tests were carried out at a pulp density of about 45% solids. The leaching procedure was studied under different conditions for twenty hours. 500 g concentrate and 610 ml of crude water from Aitik were mixed in each test. The pH was checked continuously during the tests and adjusted with $H_2SO_4$ or NaOH. Leachate samples were taken at five time points: 0.5, 1.0, 2.0, 5.0 and 24 hours.

Test conditions and results have been entered in the Table below:

TABLE

| Test No. | pH | Temperature °C. | Bi yield % | | | Cu yield % | | |
|---|---|---|---|---|---|---|---|---|
| | | | 2h | 5h | 24h | 2h | 5h | 24h |
| 1 | 0 | 25 | 36 | 35 | 35 | 0.3 | 0.4 | 0.7 |
| 2 | 1.0 | 25 | 28 | 26 | 34 | 0.2 | 0.3 | 0.4 |
| 3 | 0 | 90 | 70 | 80 | 83 | 0.6 | 0.9 | 1.7 |
| 4 | 1.0 | 90 | 72 | 80 | 92 | 0.3 | 0.4 | 0.6 |
| 5 | 0.5 | 55 | 40 | 54 | 75 | 0.4 | 0.6 | 1.3 |
| 6 | 0.5 | 55 | 40 | 54 | 75 | 0.4 | 0.6 | 1.3 |
| 7 | 1.5 | 90 | 35 | 48 | 42 | 0.2 | 0.3 | 0.3 |
| 8 | 2.0 | 90 | 4 | 2 | 0 | 0.2 | 0.3 | 0.3 |
| 9 | 2.5 | 90 | 0 | 2 | 0 | 0.1 | 0.1 | 0 |
| 10 | 3.0 | 90 | 0 | 0 | 0 | 0 | 0 | 0 |

Optimal bismuth leaching conditions thus existed at a pH of 0–1 and at a temperature of 90° C., where the yields were as high as about 70% already after two hours, whereas the copper yields were, at the same time, very low, about 0.5%. The Bi-yields were never higher than about 30% at room temperature. A temperature of 55° C. greatly increases the yields. Practically no leaching of either Bi or Cu is obtained at pH=2 or higher.

Suitable leaching times for the type of concentrate concerned are established by appropriate similar laboratory tests, although restricted to the most optimal conditions at chosen leaching temperatures. The necessary leaching time is governed by the highest residual bismuth content desired in the concentrate. It may even be relevant and economically beneficial to lower the bismuth content to a very low level when possible with regard to possible valuable metal losses in the treatment process. In other words, the leaching time can be determined primarily with regard to the market situation, i.e. the value of concentrate of different degrees of purity with regard to bismuth. The inventive method can thus be adapted readily and neatly to current technical or market requirements, even with respect to ores or concentrates of the most varying compositions.

We claim:

1. A method of treating a copper-containing metal sulphide ore or copper-containing metal sulphide ore concentrate that contains bismuth as an impurity to reduce the bismuth content thereof comprising contacting the ore or concentrate with sulfuric acid at an elevated temperature and a pH of below 2 to preferentially leach bismuth from the ore or concentrate and so as to form a leachate containing the leached bismuth and an upgraded ore or concentrate, and separating the leachate containing the leached bismuth from the upgraded ore or concentrate.

2. The method of claim 1 wherein the ore or concentrate is contacted with the sulfuric acid at a pH of 0–1.

3. The method of claim 2 wherein the ore or concentrate is contacted with the sulfuric acid at a temperature above about 50° C.

4. The method of claim 3 wherein the ore or concentrate is contacted with the sulfuric acid at a temperature above about 90° C.

5. The method of claim 3 wherein the ore or concentrate is contacted with the sulfuric acid in two or more sequential steps.

6. The method of claim 1 wherein the ore or concentrate is contacted with the sulfuric acid at a temperature above about 50° C.

7. The method of claim 6 wherein the ore or concentrate is contacted with the sulfuric acid at a temperature above about 90° C.

8. The method of claim 1 wherein the ore or concentrate is contacted with the sulfuric acid in two or more sequential steps.

* * * * *